(12) United States Patent
Alidan

(10) Patent No.: US 9,796,434 B2
(45) Date of Patent: Oct. 24, 2017

(54) VEHICLE TIRE TRACK SYSTEM

(71) Applicant: Mohammad Gasem Alidan, Tucson, AZ (US)

(72) Inventor: Mohammad Gasem Alidan, Tucson, AZ (US)

(*) Notice: Subject to any disclaimer, the term of this patent is extended or adjusted under 35 U.S.C. 154(b) by 76 days.

(21) Appl. No.: 14/996,661

(22) Filed: Jan. 15, 2016

(65) Prior Publication Data

US 2017/0197675 A1    Jul. 13, 2017

Related U.S. Application Data

(60) Provisional application No. 62/277,313, filed on Jan. 11, 2016.

(51) Int. Cl.
| | | |
|---|---|---|
| *B62D 55/06* | (2006.01) | |
| *B62D 55/24* | (2006.01) | |
| *B62D 55/084* | (2006.01) | |
| *B62D 55/32* | (2006.01) | |
| *B62D 55/12* | (2006.01) | |
| *B62D 55/02* | (2006.01) | |

(52) U.S. Cl.
CPC ........... *B62D 55/06* (2013.01); *B62D 55/084* (2013.01); *B62D 55/12* (2013.01); *B62D 55/24* (2013.01); *B62D 55/32* (2013.01); *B62D 55/02* (2013.01)

(58) Field of Classification Search
CPC ...... B62D 55/04; B62D 55/06; B62D 55/084; B62D 55/12; B62D 55/125; B62D 55/24; B62D 55/30; B62D 55/32; B60B 15/10; B60B 9/24; B60B 19/04
See application file for complete search history.

(56) References Cited

U.S. PATENT DOCUMENTS

| | | | | |
|---|---|---|---|---|
| 1,031,174 A | * | 7/1912 | Fregoso | ................. B62D 55/08 305/126 |
| 1,255,218 A | * | 2/1918 | Paulsen | .................. B62D 55/08 305/126 |
| 2,050,845 A | * | 8/1936 | Jett | ......................... B62D 55/08 305/115 |

(Continued)

FOREIGN PATENT DOCUMENTS

| | | | | |
|---|---|---|---|---|
| DE | GB 838894 A | * | 6/1960 | ......... B62D 49/0635 |
| FR | 856432 A | * | 6/1940 | ............. B62D 55/12 |

(Continued)

*Primary Examiner* — Kip T Kotter

(74) *Attorney, Agent, or Firm* — Oblon, McClelland, Maier & Neustadt, L.L.P.

(57) ABSTRACT

A vehicle tire track system having a tread hub including at least one spoke assembly positioned in a radial direction from the center of the tread hub, with the tread hub rigidly connected to a driven wheel of the vehicle, a belt having internal teeth disposed on an inside surface of the belt, at least two roller arms, each rotatably connected at a first end to the tread hub, at least two rollers, each rotatably connected to a second end of the at least two roller arms, and a tensioning device, disposed to provide tension between the roller arms. The belt is connected around the spoke assemblies of the tread hub and at least two rollers, and the belt is driven as the driven wheel of the vehicle turns the tread hub and force is transferred from at least one spoke assembly to the internal teeth of the belt.

15 Claims, 15 Drawing Sheets

(56) References Cited

U.S. PATENT DOCUMENTS

| | | | | |
|---|---|---|---|---|
| 3,184,268 | A | * | 5/1965 | Blindenbacher ...... B60C 27/045 180/15 |
| 3,207,562 | A | * | 9/1965 | Ewing ...................... B60F 1/00 105/215.1 |
| 4,046,339 | A | * | 9/1977 | Stancliffe ................ B64C 25/36 244/103 R |
| 5,492,390 | A | * | 2/1996 | Kugelmann, Sr. ...... B60B 19/00 301/5.1 |
| 6,164,736 | A | * | 12/2000 | Warner .................... B60B 9/00 305/125 |
| 7,261,655 | B2 | | 8/2007 | Vargas |
| 7,547,078 | B2 | | 6/2009 | Spector et al. |
| 2005/0035650 | A1 | * | 2/2005 | Toews ................ B62D 49/0635 301/1 |
| 2005/0127752 | A1 | * | 6/2005 | Spector ................. A61G 5/061 305/126 |
| 2006/0185911 | A1 | * | 8/2006 | Gunderson ........ B62D 49/0635 180/8.3 |
| 2013/0175101 | A1 | * | 7/2013 | Zakuskin ............... B62D 55/04 180/9.26 |
| 2013/0181508 | A1 | | 7/2013 | Zakuskin |
| 2014/0265536 | A1 | * | 9/2014 | Hein ...................... B60B 19/04 301/91 |

FOREIGN PATENT DOCUMENTS

| | | | |
|---|---|---|---|
| JP | 03182886 A | * | 8/1991 |
| JP | 2000-006857 A | | 1/2000 |
| JP | 2011-080577 A | | 4/2011 |
| WO | 2008/079174 A2 | | 7/2008 |

* cited by examiner

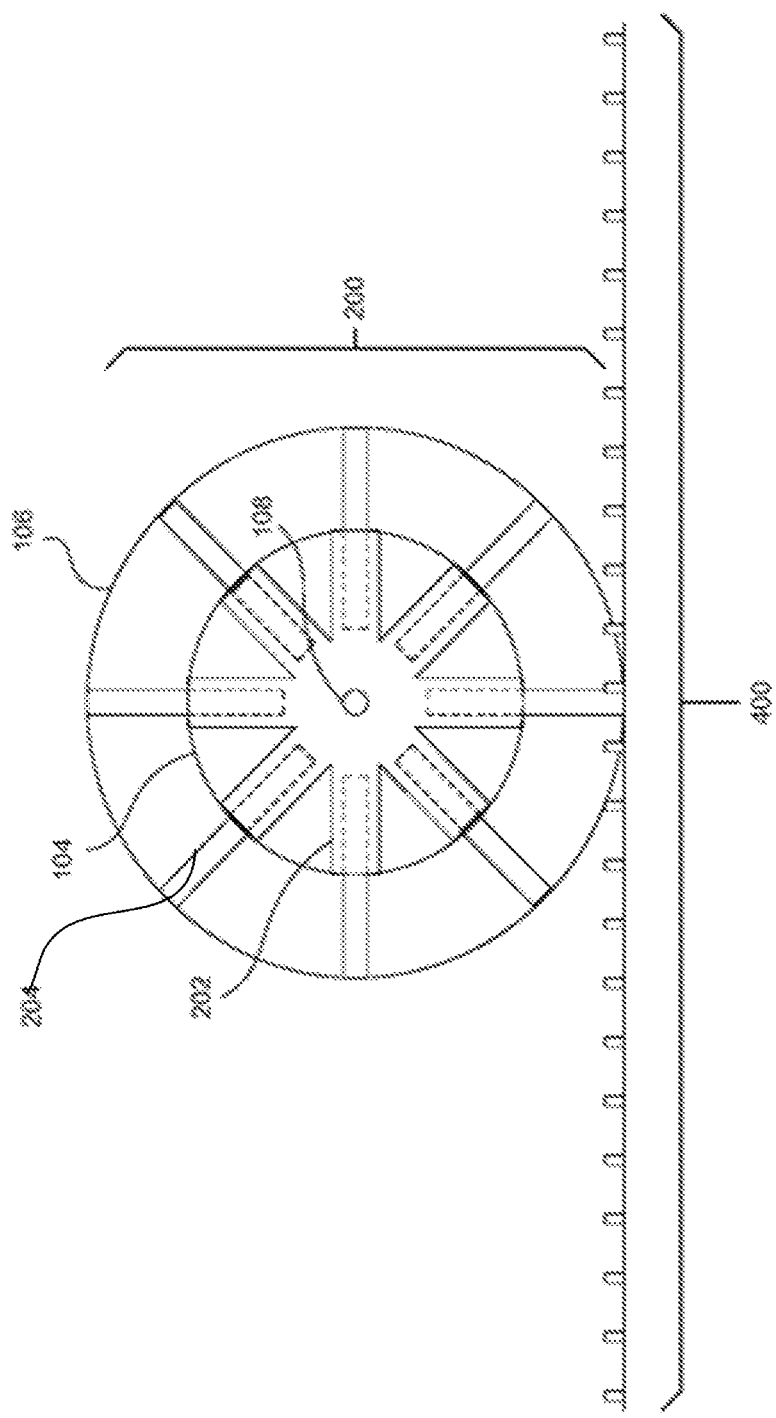

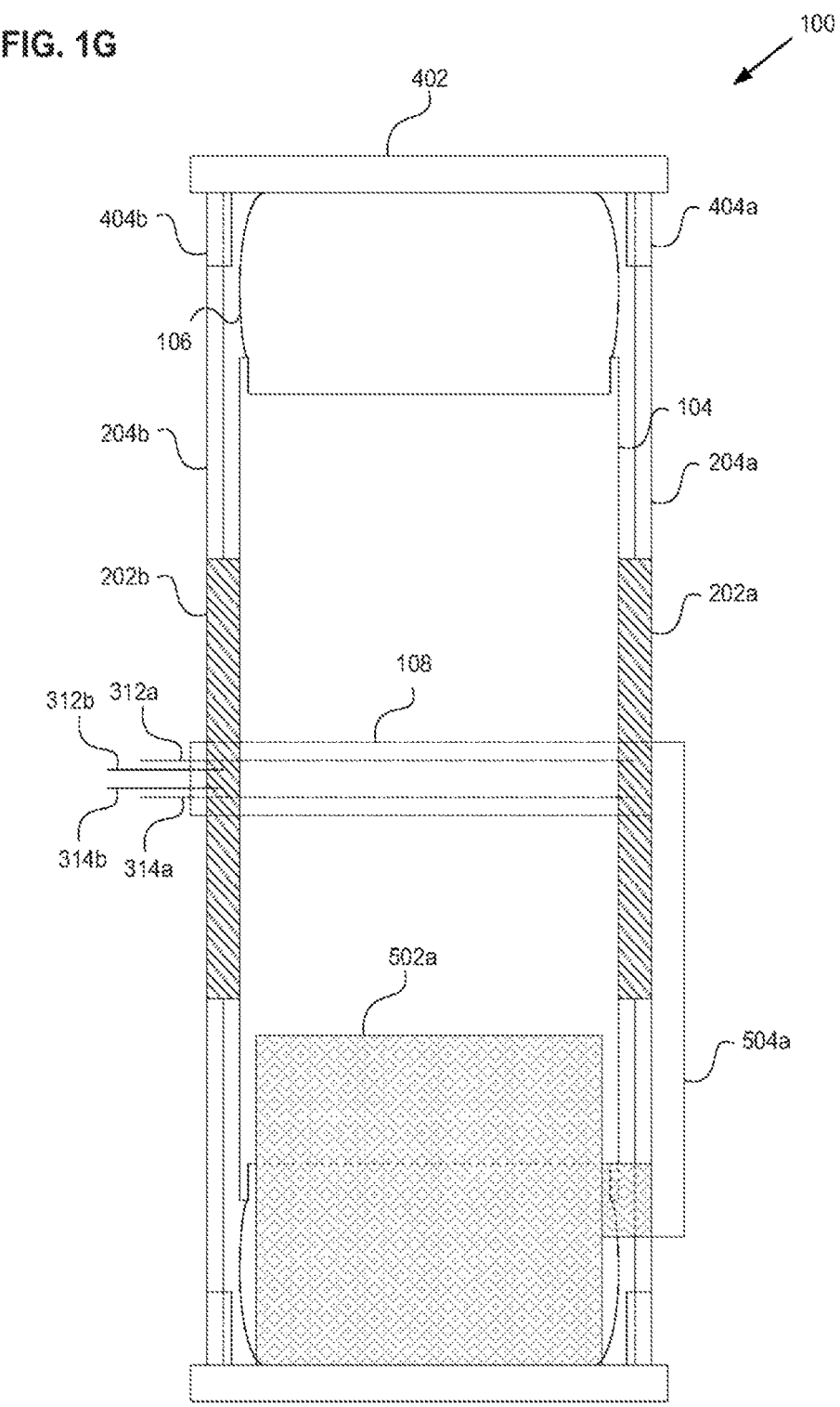

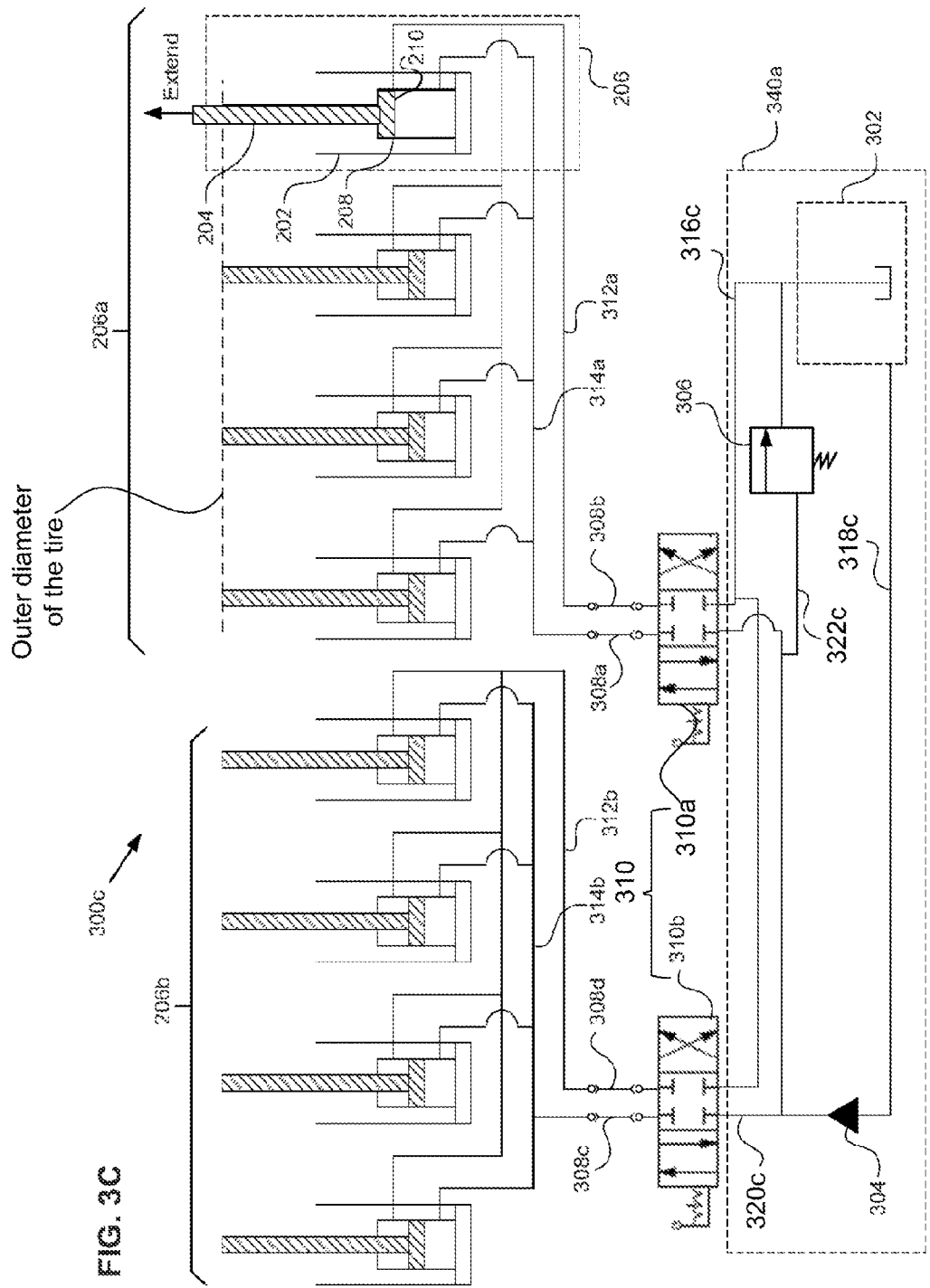

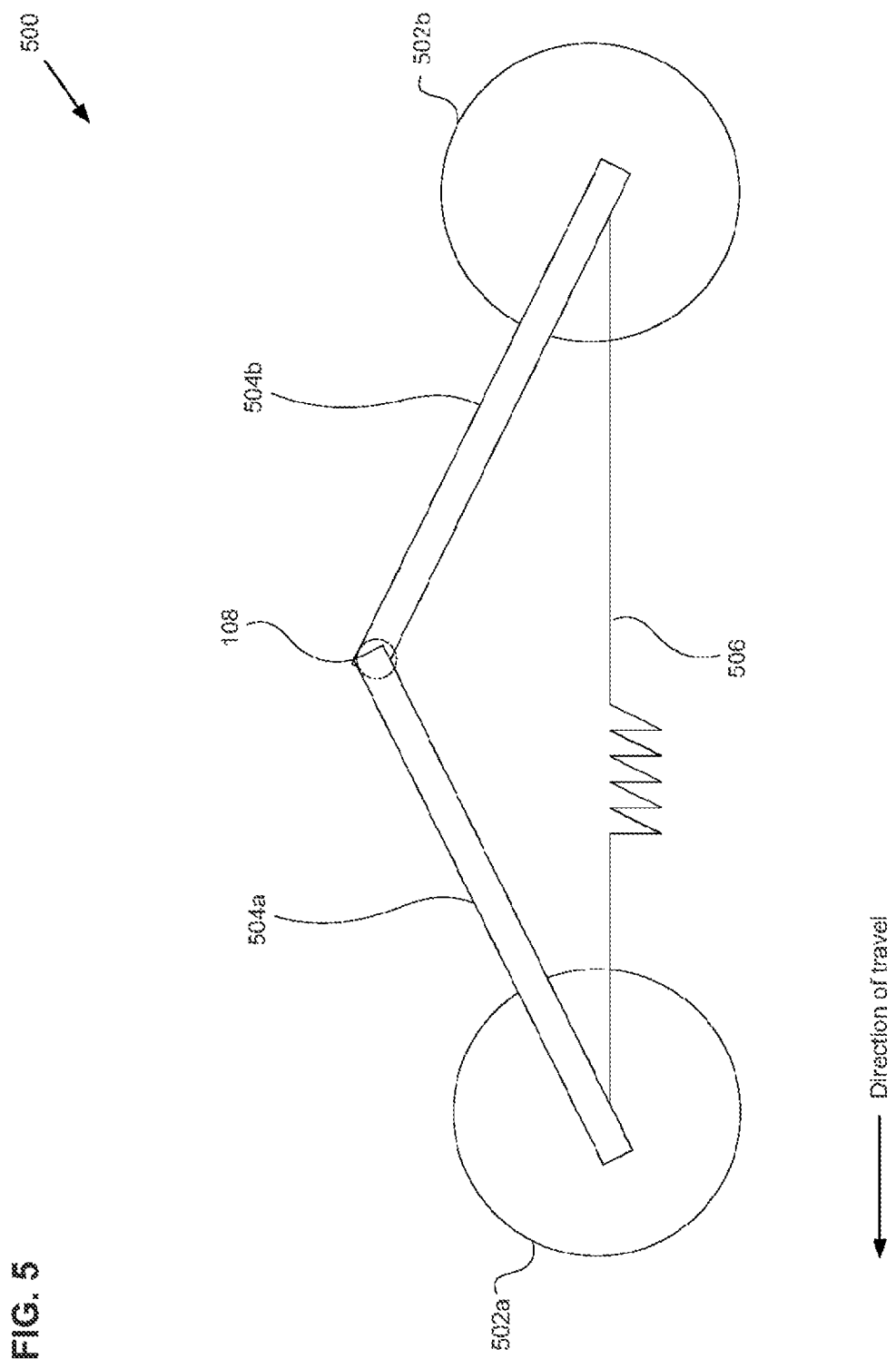

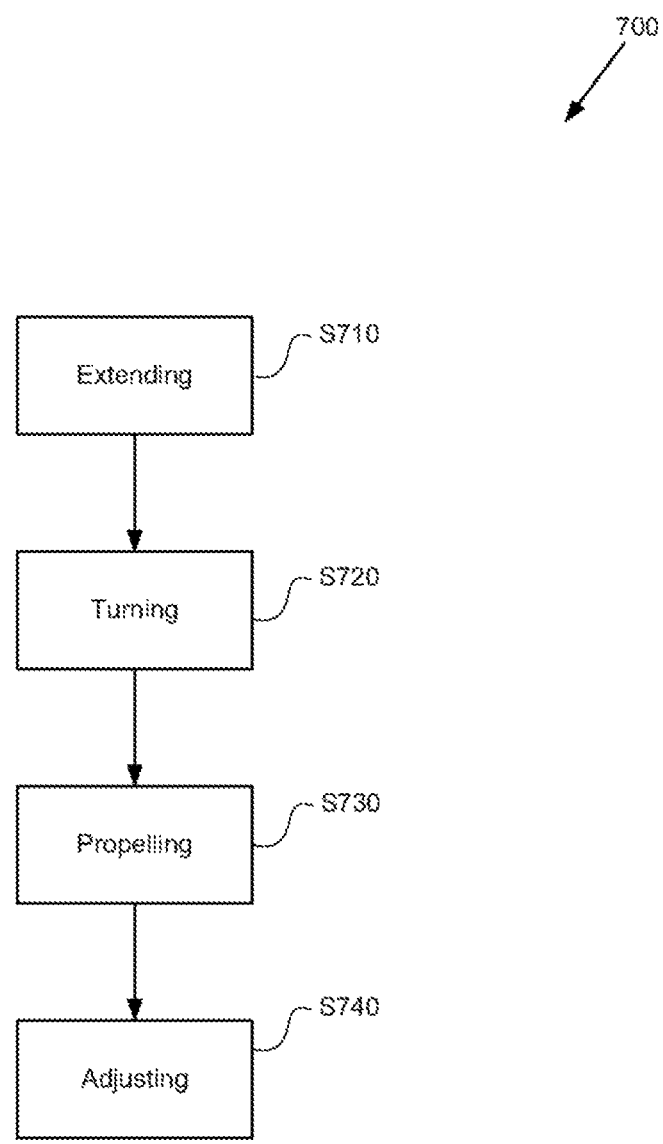

VEHICLE TIRE TRACK SYSTEM

CROSS-REFERENCE TO RELATED APPLICATIONS

This application claims the benefit of U.S. Provisional Application No. 62/277,313 filed Jan. 11, 2016.

BACKGROUND

Description of the Related Art

The risk of a wheeled vehicle getting stuck or stranded, and the attendant safety issues, continues to be a challenge in some geographic areas and under certain conditions. At times it is life threatening and assistance may not be immediately available.

For these reasons it is important that improved methods and apparatus are developed for wheeled vehicles to be able to better maneuver through such conditions, with the aim of reducing the frequency and severity of such vehicles becoming stranded.

SUMMARY

The present disclosure is directed to a vehicle tire track system having a tread hub including at least one spoke assembly positioned in a radial direction from the center of the tread hub, with the tread hub rigidly connected to a driven wheel of the vehicle, a belt having internal teeth disposed on an inside surface of the belt, at least two roller arms, each rotatably connected at a first end to the tread hub, at least two rollers, each rotatably connected to a second end of the at least two roller arms, and a tensioning device, disposed to provide tension between the roller arms. The belt is connected around the spoke assemblies of the tread hub and at least two rollers, and the belt is driven as the driven wheel of the vehicle turns the tread hub and force is transferred from at least one spoke assembly to the internal teeth of the belt.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 1D is a side view of the tire, the wheel, and a wheel spoke system on the track belt, according to one example;

FIG. 1G is a front section view of the tire track system with the track belt assembled, according to one example;

FIG. 3C is a schematic of a pressure system, according to another example;

FIG. 5 is a side view of a tensioning system, according to one example;

FIG. 7 is a diagram representing a sequence of primary processes of a method for operating a tire track system, according to one example.

DETAILED DESCRIPTION OF THE EMBODIMENTS

Figure 1A:
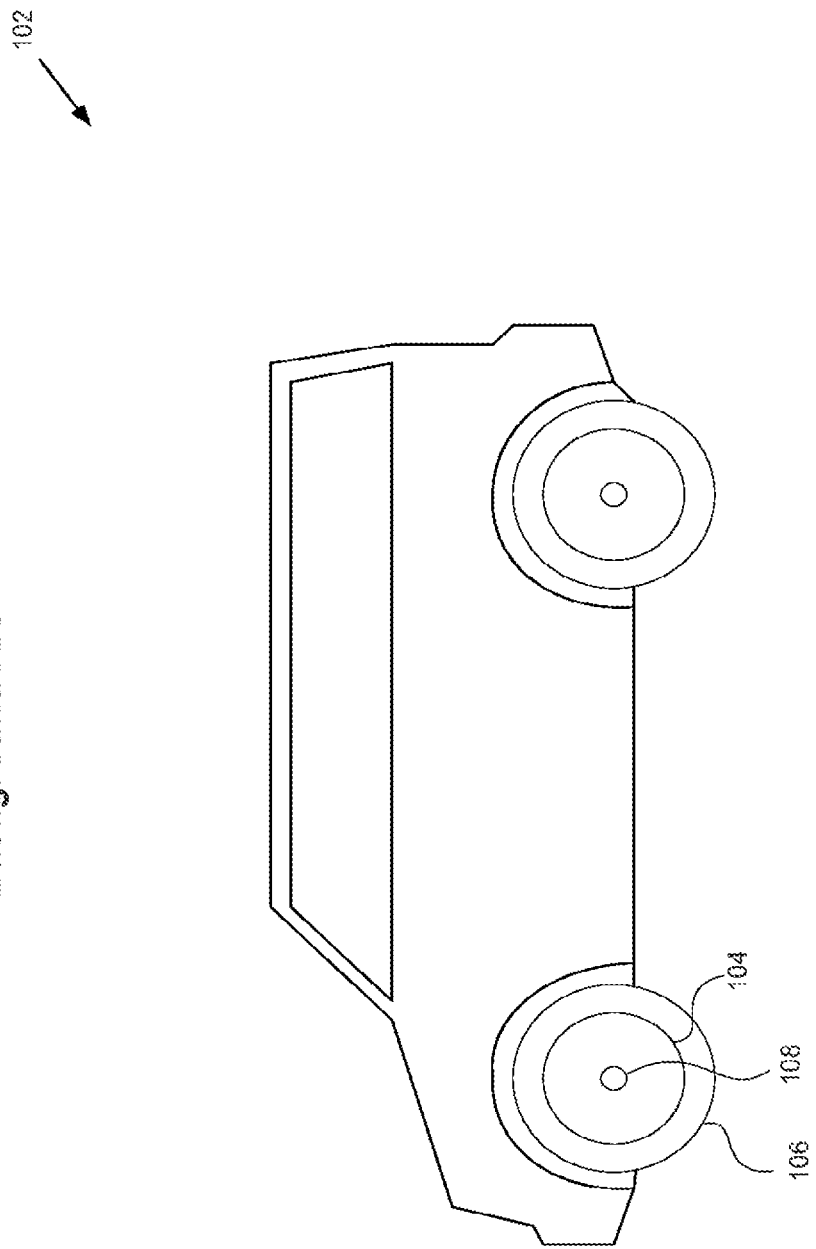
FIG. 1A is a side view of a vehicle, according to one example.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

FIG. 1A is a side view of a vehicle 102, according to one example. The vehicle 102 comprises a wheel 104 concentrically connected to a wheel hub 108, and a tire 106 concentrically connected to the wheel 104. The wheel hub 108 is rotatably connected to the vehicle 102 while the wheel 104 and tire 106 are connected to the wheel hub 108 such that the wheel 104, the tire 106, and the wheel hub 108 rotate concentrically together at an approximately equal angular rate. Propulsion force from the vehicle 102 propels the vehicle 102 forward or backward.

Figure 1B:
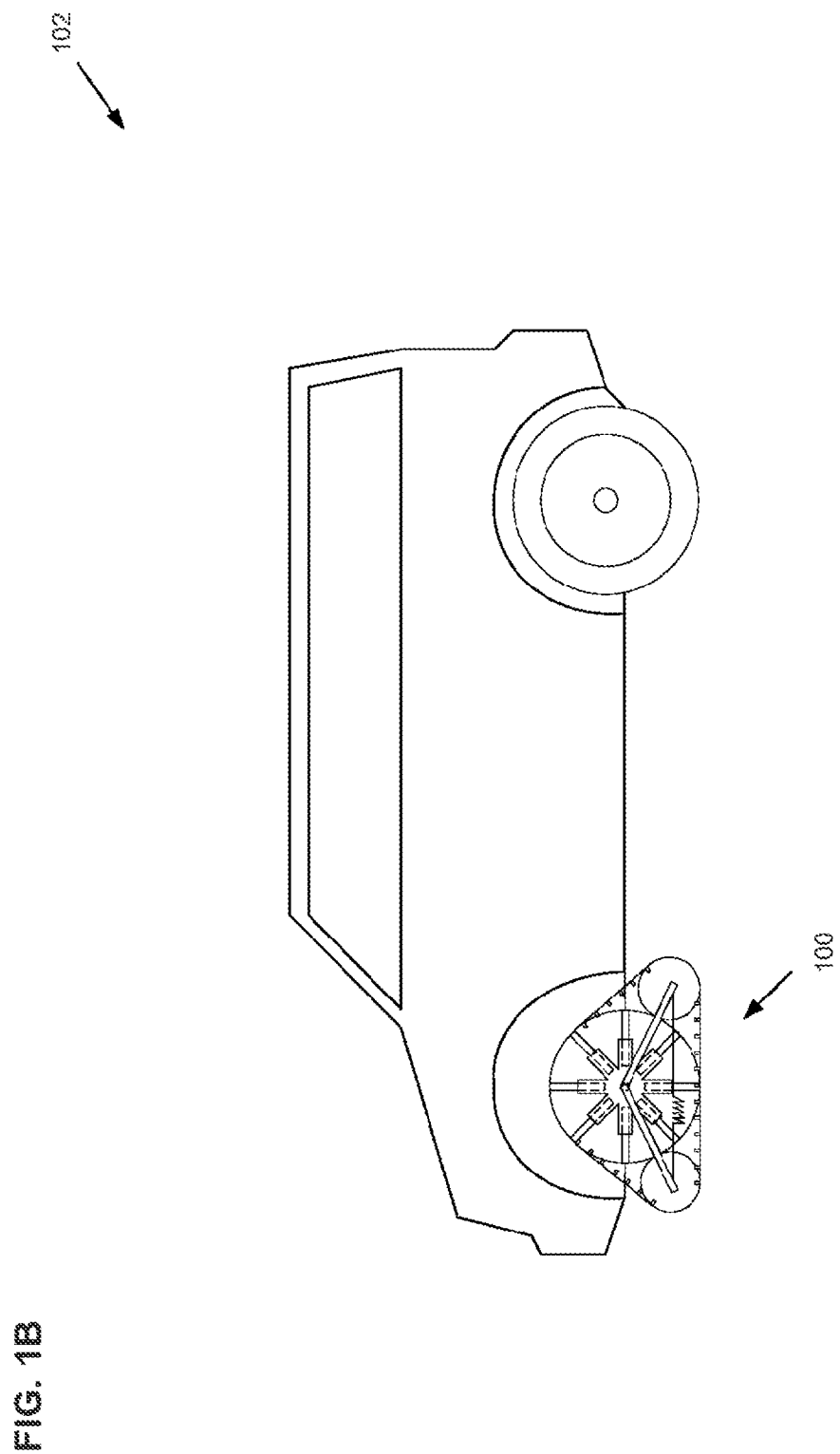
FIG. 1B is a side view of a vehicle equipped with a tire track system, according to one example.

FIG. 1B is a side view of the vehicle 102 equipped with a tire track system 100, according to one example. The tire track system 100 is disposed at a front position of the vehicle 102 in this view, and may propel the vehicle 102 forward or backward.

Figure 1C:
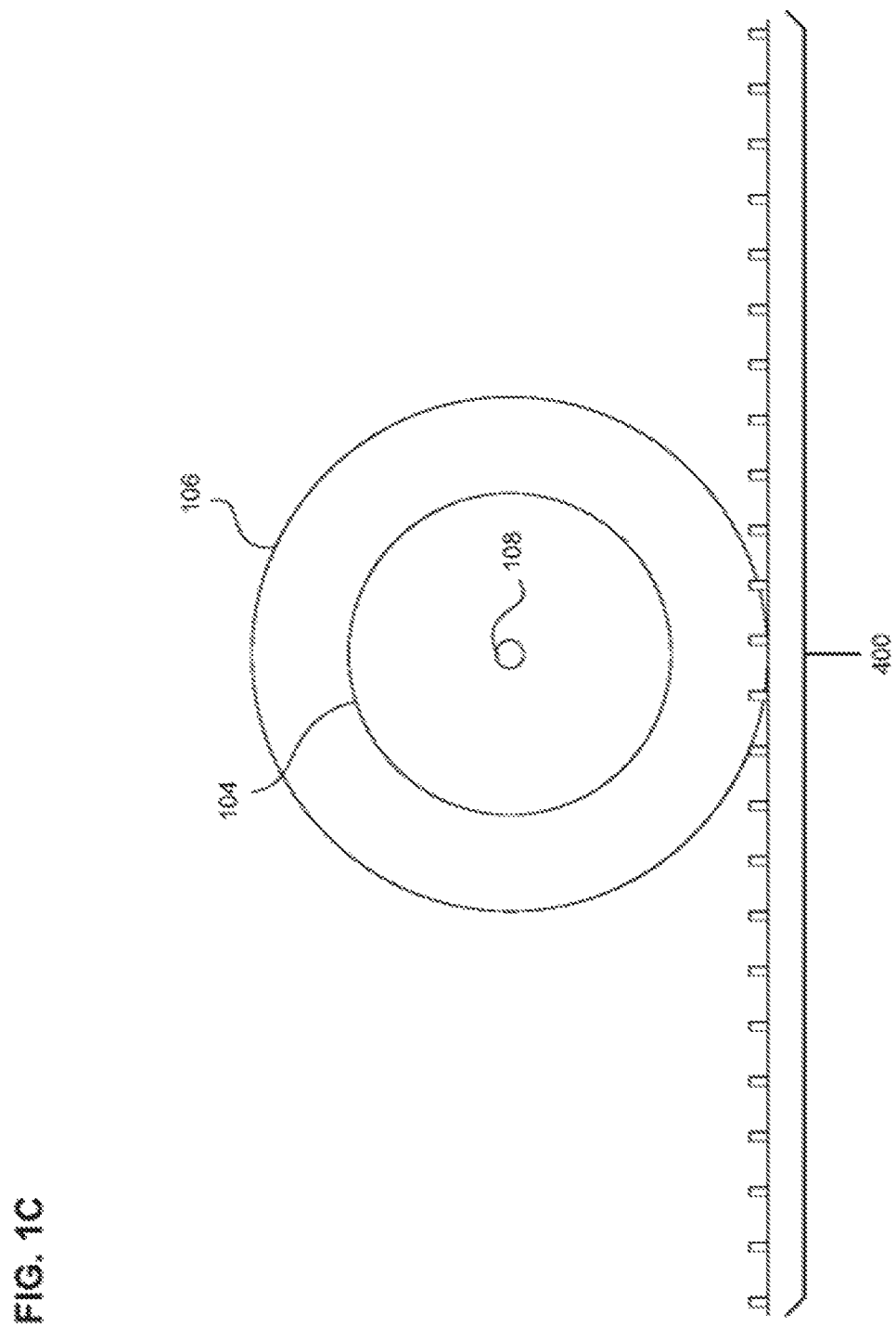
FIG. 1C is a side view of a tire, a wheel, and wheel disposed on a track belt, according to one example.

FIG. 1C is a side view of the tire 106, the wheel 104, and the wheel hub 108 disposed on a track belt 400, according to one example. The track belt 400 is in an open position and comprises a plurality of track belt links 402a, 402b, as described by FIG. 4A and FIG. 4B. A first end of the track belt 400 is not connected to a second end of the track belt 400, as the track belt 400 is not fully assembled.

FIG. 1D is a side view of the tire 106, the wheel 104, and a wheel spoke system 200 disposed on a track belt 400, according to one example, and identical to that described by FIG. 1C, with the addition of a tread hub 202 and a plurality of spokes 204. The tread hub 202 is rigidly connected to the wheel 104 at the wheel hub 108. The wheel 104, the tread hub 202, and the wheel hub 108 rotate concentrically about a common axis at the same angular velocity. Each of the spokes 204 is connected to the tread hub 202, extends outwardly from within the tread hub 202, and retracts at least partially back into the tread hub 202 as rotation of the track belt 400 approaches contact with the tire 106. In some cases, extension of the spoke 204 may result in an effective diameter of the wheel spoke system 200 that is greater than the diameter of the tire 106 to which the wheel spoke system 200 is connected.

Figure 1E:
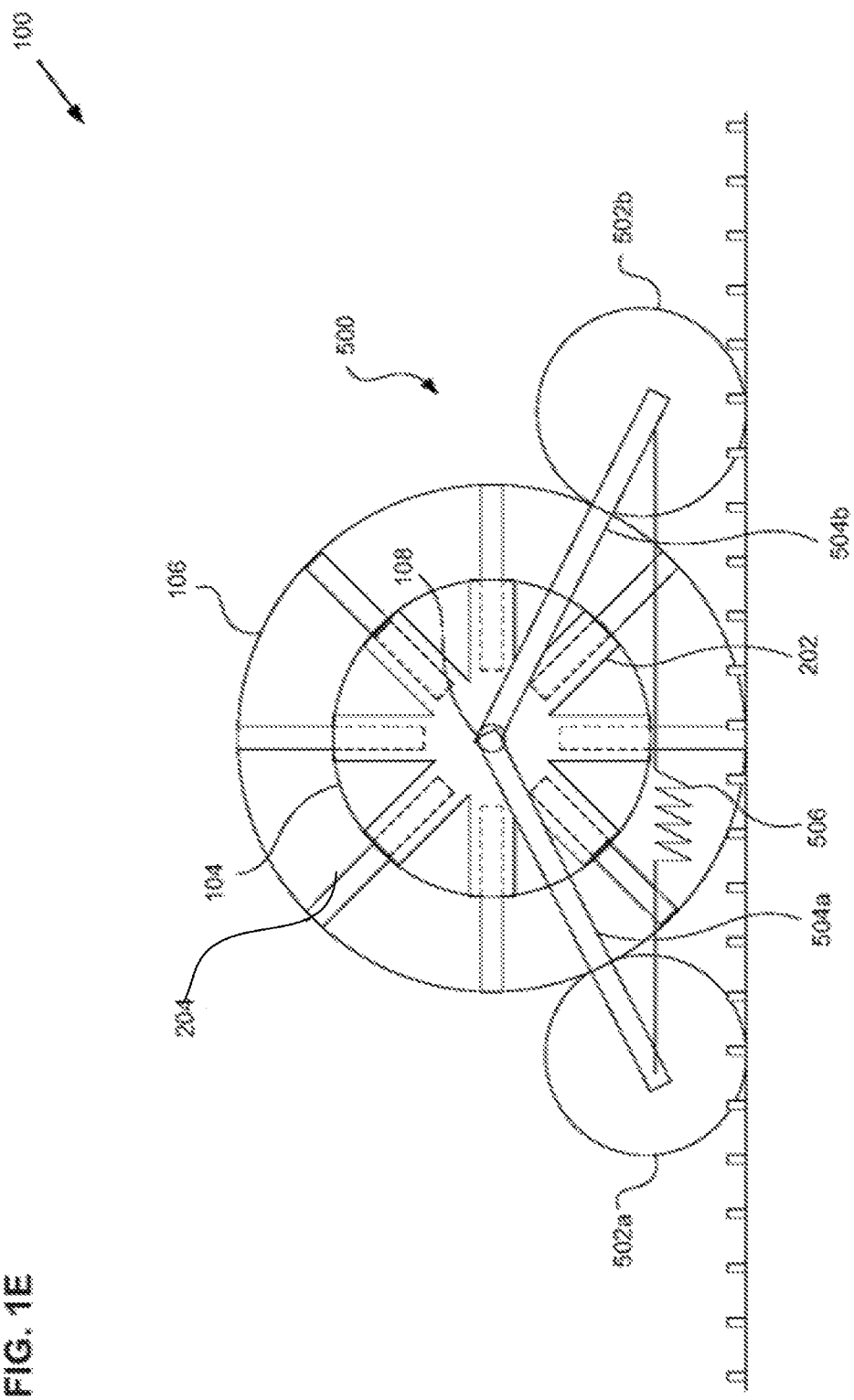
FIG. 1E is a side view of a tire track system with the track belt open, according to one example.

FIG. 1E is a side view of the tire track system 100 with the track belt 400 open, according to one example. The tire track system 100 shown is identical to that of FIG. 1D with the addition of a tensioning system 500 rotatably connected to the wheel hub 108 on a side of the wheel 104 such that the wheel 104 may rotate without the tensioning system 500 rotating. The tensioning system 500 comprises a roller 502*a*, 502*b*, a roller arm 504*a*, 504*b*, and a tension device 506. The roller 502*a*, 502*b* are rotatably connected to the roller arms 504*a*, 504*b*, respectively, and may rotate in the same plane as the wheel 104. However, the surface of each of the roller 502*a*, 502*b* that is in contact with the track belt 400 and the tire 106 may have very low friction to allow the track belt 400 to slide over the roller 502*a*, 502*b* as the wheel 104 turns. The rollers 502*a*, 502*b* serve as guides for the track belt 400 and may not necessarily rotate proportionally to either the track belt 400 or the tire 106. This is significant because otherwise the rollers 502*a*, 502*b* could rotate proportionally to the wheel 104 but in the direction opposite of the desired direction. The tensioning system 500 is further described by FIG. 5.

Figure 1F:
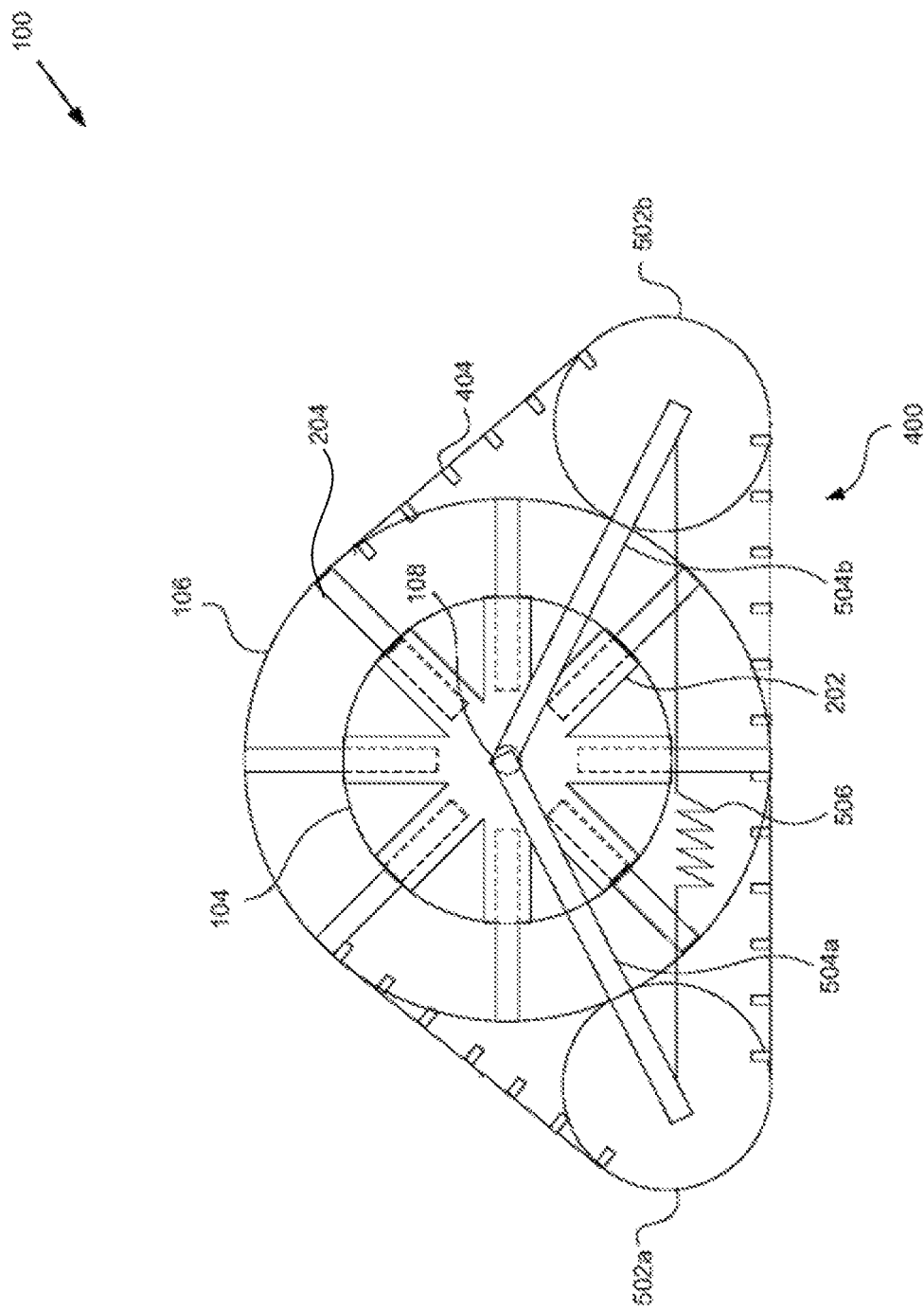
FIG. 1F is a side view of the tire track system with the track belt assembled, according to one example.

FIG. 1F is a side view of the tire track system 100 with the track belt 400 assembled, according to one example. The tire track system 100 shown is identical to that of FIG. 1E, with the exception that the track belt 400 is fully assembled into a closed loop surrounding the tire 106, the roller 502*a*, and the roller 502*b*. This view depicts a complete tire track system 100, the same as shown connected to the vehicle 102 in FIG. 1B. For illustrative purposes, not all of the belt stud 404 are shown. However, the plurality of belt studs 404 is generally evenly distributed around an entire inner surface of the track belt 400.

As the vehicle 102 provides propulsion to the wheel hub 108, the wheel 104, the tire 106, and the tread hub 202 rotate together as one. In the condition where the plurality of spokes 204 are extended such that at least one of the spokes 204 is in contact with at least one of the belt studs 404, propulsion of the wheel 104 results in propulsion of the track belt 400 through contact between the at least one spoke 204 and the at least one belt stud 404. The roller 502*a* and the roller 502*b* provide guidance to the track belt 400 as it rotates with and about the tire 106, the roller 502*a*, and the roller 502*b* in proportion to the rotational speed of the tire 106.

In one example, all the spokes 204 extend and retract by the same magnitude simultaneously. When all the spokes 204 are extended to a distance where an outer end of each spoke 204 is adjacent to approximately the diameter of the tire 106, contact between the at least one spoke 204 and the at least one belt stud 404 occurs over a range of angular rotation of the tread hub 202. The range depends on the proportional relationship between the disposition and diameters of the roller 502*a* and the roller 502*b*, and that of the tire 106.

In another example, at least one of the spokes 204 may independently extend and retract by varying magnitudes, allowing simultaneous contact between more of the plurality of spokes 204 and the plurality of belt studs 404 than in the case where all the spokes 204 extend and retract by the same magnitude simultaneously.

In the case where all the spokes 204 are controlled to extend and retract the same amount simultaneously the largest permissible effective diameter of the wheel spoke system 200 is approximately that of the outer diameter of the tire 106. In that case, the plurality of spokes 204 only make contact with the plurality of belt studs 404 at positions where the track belt 400 is in contact with the tire 106. If the effective diameter of the wheel spoke system 200 were to exceed the outer diameter of the tire 106 in that way, the length of the track belt 400 would have to increase, a condition that could only occur if the plurality of the track belt links 402*a*,402*b* was formed of an elastic material. Further, an effective diameter of the wheel spoke system 200 larger than that of the tire 106 could result in a rough ride and interference between the tire track system 100 and the vehicle 102.

In a case where each of the spokes 204 is controlled to extend and retract individually, the largest permissible effective diameter of the wheel spoke system 200 is still approximately that of the outer diameter of the tire 106. However, an individual spoke 204 may be extended further to make contact with a belt stud 404 and provide propulsion to the tire track system 100 at more contact points where the track belt 400 may not be in contact with the tire 106, such as along a ground surface ahead of or behind the tire 106. The result is more of the plurality of the spokes 204 are in contact with and providing propulsion to a larger plurality of the belt studs 404, smoothing out the power application and extending life reducing the wear and tear of the track belt 400.

In another example, the tire track system 100 is connected to a non-driven wheel 104, for example a rear wheel of a front wheel drive vehicle 102. The wheel 104 may rotate as the track belt 400 travels along a ground surface. The rotational speed of the track belt 400 may be greater than that of the tire 106, depending on the level of friction between the tire 106 and a surface of the track belt 400 it is in contact with tire 106.

While no propulsion force is provided by the wheel 104 in such condition, if there is sufficient friction between a side of the track belt 400 and a ground surface, the wheel spoke system 200 could still provide brake force through contact between the at least one spoke 204 and the at least one belt stud 404 in the reverse direction as brake force is applied to the wheel 104, or by a braking system of the vehicle 102.

The tension device 506, further described by FIG. 5, keeps the roller 502*a* and the roller 502*b* in place and in contact with the tire 106 by applying a tension between the roller arm 504*a* and the roller arm 504*b*, and maintaining a relatively consistent distance around the tire 106, the roller 502*a*, and the roller 502*b* for the track belt 400 to rotate about.

In one example, the tension device 506 may apply sufficient tension as to increase ground clearance of the vehicle 102 to maneuver over obstacles and rough terrain or to provide access to underneath the vehicle 102 as a jack would.

FIG. 1G is a front section view of the tire track system 100 with the track belt 400 assembled, according to one example. The tire track system 100 shown is identical to and functions as that described by FIG. 1F, with some components visible in this view that are not visible in FIG. 1F, and comprises the wheel 104, the tire 106, the wheel hub 108, the tread hubs 202*a*, 202*b*, the spokes 204*a*, 204*b*, return lines 312*a*, 312*b*, input lines 314*a*, 314*b*, the plurality of track belt links 402*a*,402*b*, the belt studs 404*a*, 404*b*, the roller 502*a*, and the roller arm 504*a*.

In one example, the tire track system 100 includes a tread hub 202*a* connected to a first side of the wheel 104 and a tread hub 202*b* connected to a second side of the wheel 104. Each tread hub 202*a*, 202*b* has a plurality of spokes 204*a*, 204*b*, that contacts a plurality of belt studs 404*a*, 404*b* disposed on the first side and on the second side, respectively, of the inside of the track belt 400.

The return line 312*a* and the input line 314*a* are disposed within the wheel hub 108 and connect a first pressure control unit 340 of the vehicle 102 (not shown) to the tread hub 202*a* to control the extension and retraction of the plurality of spokes 204*a* of the tread hub 202*a*, with at least one of the spokes 204*a* disposed to contact at least one belt studs 404*a*.

The return line 312*b* and the input line 314*b* are disposed within the wheel hub 108 and connect a first pressure control unit 340 of the vehicle 102 (not shown) to the tread hub 202*b*, to control the extension and retraction of the plurality of spokes 204*b* of the tread hub 202*b*, with at least one of the spokes 204*b* disposed to contact at least one belt stud 404*b*.

The roller 502*a* is disposed in front of the tire 106 in this view, and is rotatably connected to a first end of the roller arm 504*a*. A second end of the roller arm 504*a* is rotatably connected to the wheel hub 108, allowing the second of the roller arm 504*a* to pivot relative to the wheel hub 108. The roller 502*b* and the roller arm 504*b* are connected in a similar fashion but are not visible in this view as they are disposed behind the tire 106 and the roller arm 504*a*, respectively.

The tire 106, the roller 502*a*, and the roller 502*b* are disposed within the track belt 400, the track belt 400 formed from the plurality of track belt links 402*a*,402*b* linked together. Each of the tire 106, the roller 502*a*, and the roller 502*b* may make contact with and are supported by an inside surface of the track belt 400.

Figure 2:
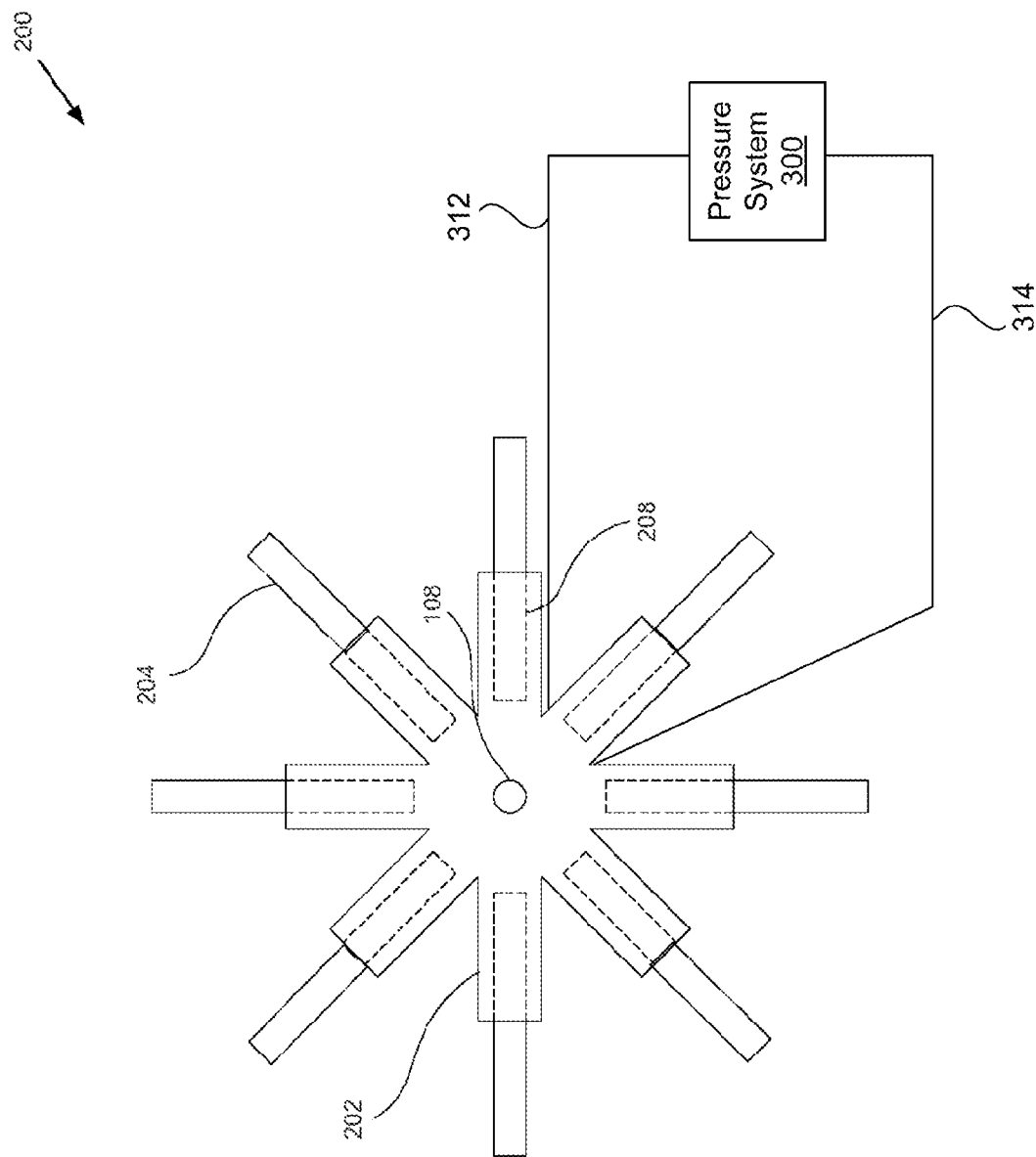
FIG. 2 is a side view of the wheel spoke system, according to one example.

FIG. 2 is a side view of the wheel spoke system 200, according to one example. The wheel spoke system 200 comprises the tread hub 202, a plurality of spoke cylinders 208, and the plurality of spokes 204. Each spoke 204 is disposed within a spoke cylinder 208 of the tread hub 202 and extends and retracts radially, relative to the center of the tread hub 202. As the tread hub 202 rotates, extension of at least one of the spoke 204 increases the effective diameter of the wheel spoke system 200, while retraction of the plurality of the spokes 204 decreases the effective diameter of the wheel spoke system 200. The wheel spoke system 200 is connected to the return line 312 and the input line 314, further described by FIG. 3A through FIG. 3C. The return line 312 and the input line 314 are part of a pressure system 300, as illustrated in FIG. 2, that controls the operation of the plurality of the spoke 204.

In one example, a pressure system 300*a* may control the extension and retraction of each spoke 204 individually.

In another example, a pressure system 300*b* controls the plurality of spokes 204 such that the plurality of spokes 204 can only extend and retract simultaneously.

In another example, a pressure system 300*c* may control the extension and retraction of a set of spokes 204 independently of other sets of pressure system spokes 204.

In another example, the pressure system 300 may use pneumatic air pressure or another medium to control the position of the plurality of the spokes 204.

In another example, an end of the spoke 204 includes a toothed gear profile to engage a corresponding shape on a plurality of belt studs 404, allowing the spoke 204 to drive the track belt 400.

Each wheel 104 may have a first wheel spoke system 200 connected to a first side. Further, each wheel 104 may have a second wheel spoke system 200 connected to a second side, as described by FIG. 1G.

Figure 3A:
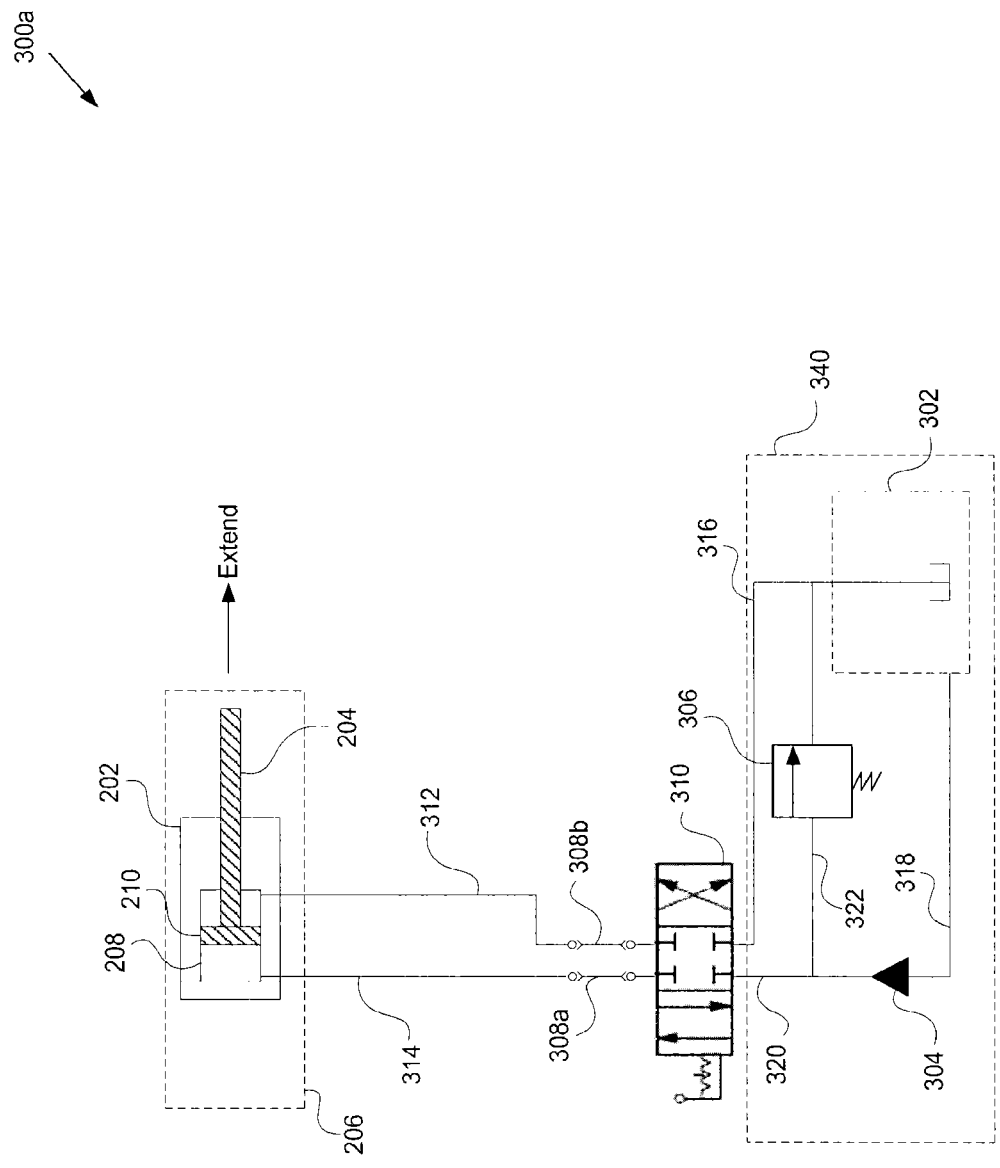
FIG. 3A is a schematic of a pressure system, according to one example.

FIG. 3A is a schematic of a pressure system 300*a*, according to one example. The pressure system 300*a* comprises a spoke assembly 206 connected to a switch 310 and a pressure control unit 340. The spoke assembly 206 is connected to the switch 310 by a return line 312 and an input line 314. The input line 314 may be connected to the switch 310 by a connection 308*a*, and the return line 312 may be connected to the switch 310 by a connection 308*b*.

In one example, the spoke assembly 206 comprises a section of the tread hub 202 having a spoke cylinder 208, a spoke piston 210, and a spoke 204. The spoke piston 210 is disposed within the spoke cylinder 208 of the tread hub 202, a first side of the spoke piston 210 facing toward the center of the tread hub 202. A first end of the spoke 204 is disposed outwardly in a radial direction from the center of the tread hub 202, and a second end of the spoke 204 is further connected to a second side of the spoke piston 210. The input line 314 is connected to the spoke cylinder 208 at a position located on the first side of the spoke piston 210 under all operating conditions, and the return line 312 is connected to the spoke cylinder 208 at a position located on the second side of the spoke piston 210 under all operating conditions. As fluid is pumped into the spoke cylinder 208 through the input line 314, increased pressure on the first side of the spoke piston 210 forces the spoke piston 210 and the spoke 204 to extend radially from the center of the tread hub 202, and for fluid on the second side of the spoke piston 210 to exit the spoke cylinder 208 through the return line 312. In another condition, as fluid is pumped into the spoke cylinder 208 through the return line 312, increased pressure on the second side of the spoke piston 210 forces the spoke piston 210 and the spoke 204 to retract radially toward the center of the tread hub 202, and for fluid on the first side of the spoke piston 210 to exit the spoke cylinder 208 through the input line 314. Fluid flow in the return line 312 and the input line 314 is controlled by the switch 310.

In one example, a first position of the switch 310 allows fluid to flow from the pressure control unit 340, through the switch 310, the connection 308*a*, and the input line 314 into the spoke cylinder 208, and increases pressure against the first side of the spoke piston 210, extending the spoke 204. Fluid in the spoke cylinder 208 on the second side of the spoke piston 210 is forced through the return line 312, the connection 308*b*, the switch 310, and into the pressure control unit 340.

A second position of the switch 310 allows fluid to flow from the pressure control unit 340, through the switch 310, the connection 308*b*, and the return line 312 into the spoke cylinder 208, and increases pressure against the second side of the spoke piston 210, retracting the spoke 204. Fluid in the spoke cylinder 208 on the first side of the spoke piston 210 is forced through the input line 314 and the connection 308*a*, the switch 310, and into the pressure control unit 340.

A third position of the switch 310 prevents fluid from flowing from the pressure control unit 340 into the connection 308*a* and the connection 308*b*, and vice versa. The third position of the switch 310 locks the position of the spoke 204.

In one example, the pressure control unit 340 comprises an output line 320 connecting a pump 304 to the switch 310. The pump 304 is connected to a reservoir 302 by a reservoir output line 318, and a reservoir return line 316 is connected to the reservoir 302. Further, the output line 320 is connected to the reservoir 302 by a pressure relief line 322, the pressure relief line 322 having a valve 306 disposed along the length of the pressure relief line 322. The pressure control unit 340 operates to pump fluid into the switch 310 via the output line 320 and to route fluid from the switch 310 into the reservoir return line 316. Fluid is supplied to the output line 320 from the reservoir 302 by the pump 304. The pressure relief line 322 may connect the output line 320 back to the reservoir 302 through a valve 306 to limit the fluid entering the switch 310 to a maximum pressure. Fluid returning into the pressure control unit 340 from the switch 310 flows through the reservoir return line 316 and into the reservoir 302.

Figure 3B:
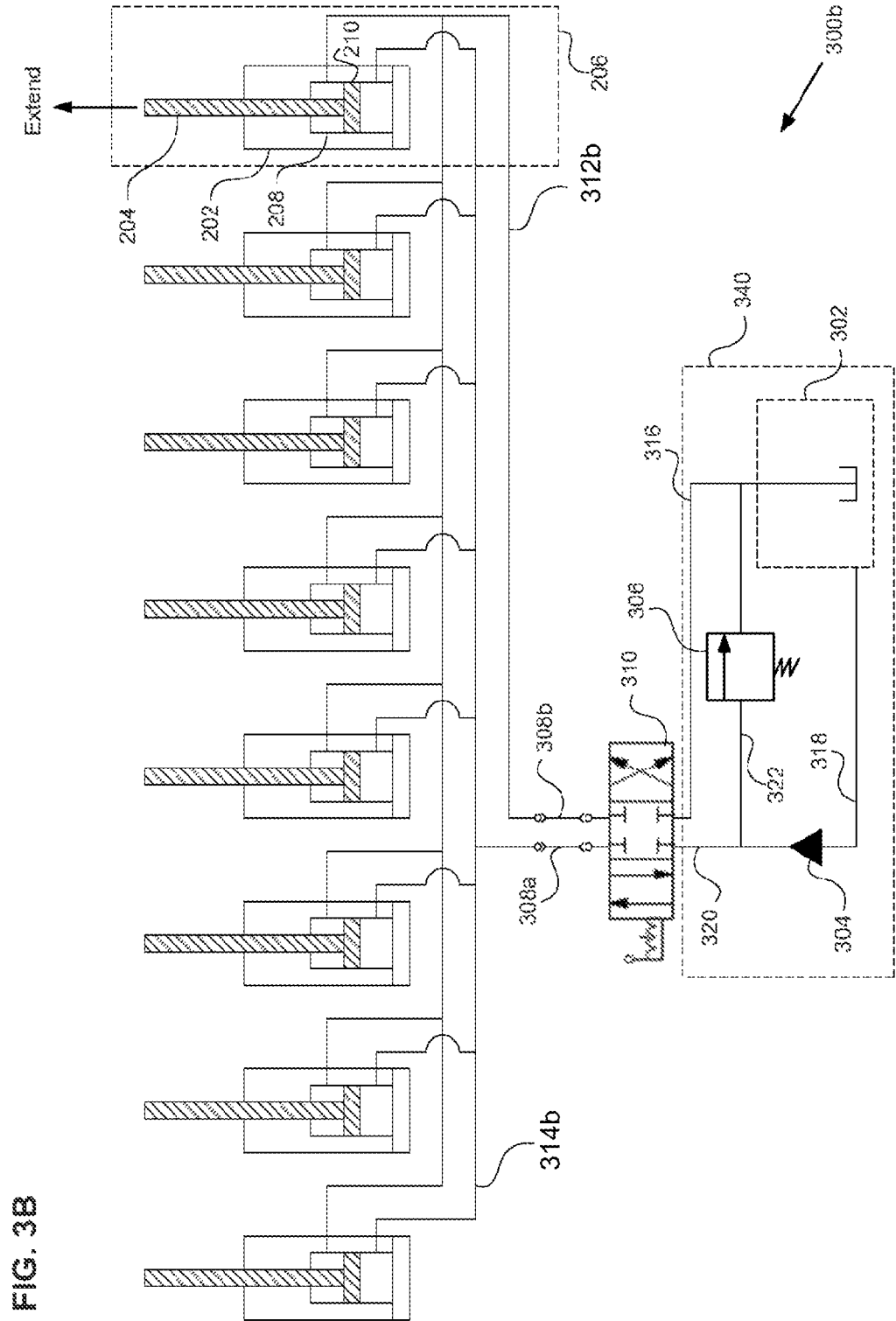
FIG. 3B is a schematic of a pressure system, according to another example.

FIG. 3B is a schematic of a pressure system 300*b*, according to one example. The pressure system 300*b* comprises a plurality of spoke assemblies 206 connected to a switch 310 and a pressure control unit 340. The plurality of spoke assemblies 206 is connected to the switch 310 by a return line 312*b* and an input line 314*b* in the same way as the single spoke assembly 206 is connected to the switch 310 as described by FIG. 3A. The input line 314*b* may be connected to the switch 310 by a 308*a*, and the return line 312*b* may be connected to the switch 310 by a 308*b*.

The difference between that described by FIG. 3A and FIG. 3B is that operation of the switch 310 and the pressure control unit 340 in FIG. 3A controls the single spoke assembly 206 whereas operation of the switch 310 and the pressure control unit 340 in FIG. 3B controls a plurality of spoke assemblies 206, and the plurality of spoke assemblies 206 move and operate in an identical way.

FIG. 3C is a schematic of a pressure system 300*c*, according to one example. The pressure system 300*c* comprises a first set of spoke assemblies 206*a* connected to a switch 310*a* and a second set of spoke assemblies 206*b* connected to a switch 310*b*. The switch 310*a* and the switch 310*b* are both connected to a pressure control unit 340*a*. The pressure control unit 340*a* is identical to the pressure control unit 340 described by FIG. 3A and FIG. 3B, the pressure control unit 340*a* can include a reservoir return line 316*c*, a reservoir output line 318*c*, an output line 320*c*, and a pressure relief line 322*c*, with the exception that the pressure control unit 340*a* comprises connections for at least two switches 310, in this example the switch 310*a* and the switch 310*a*, which operate the same way as the switch 310 described by FIG. 3A and FIG. 3B. The pressure control unit 340*a* allows independent control of the extension and retraction of multiple spoke assemblies 206 or multiple sets of spoke assemblies 206, such as the set of 206*a* and the set of 206*b* shown.

Figure 4A:
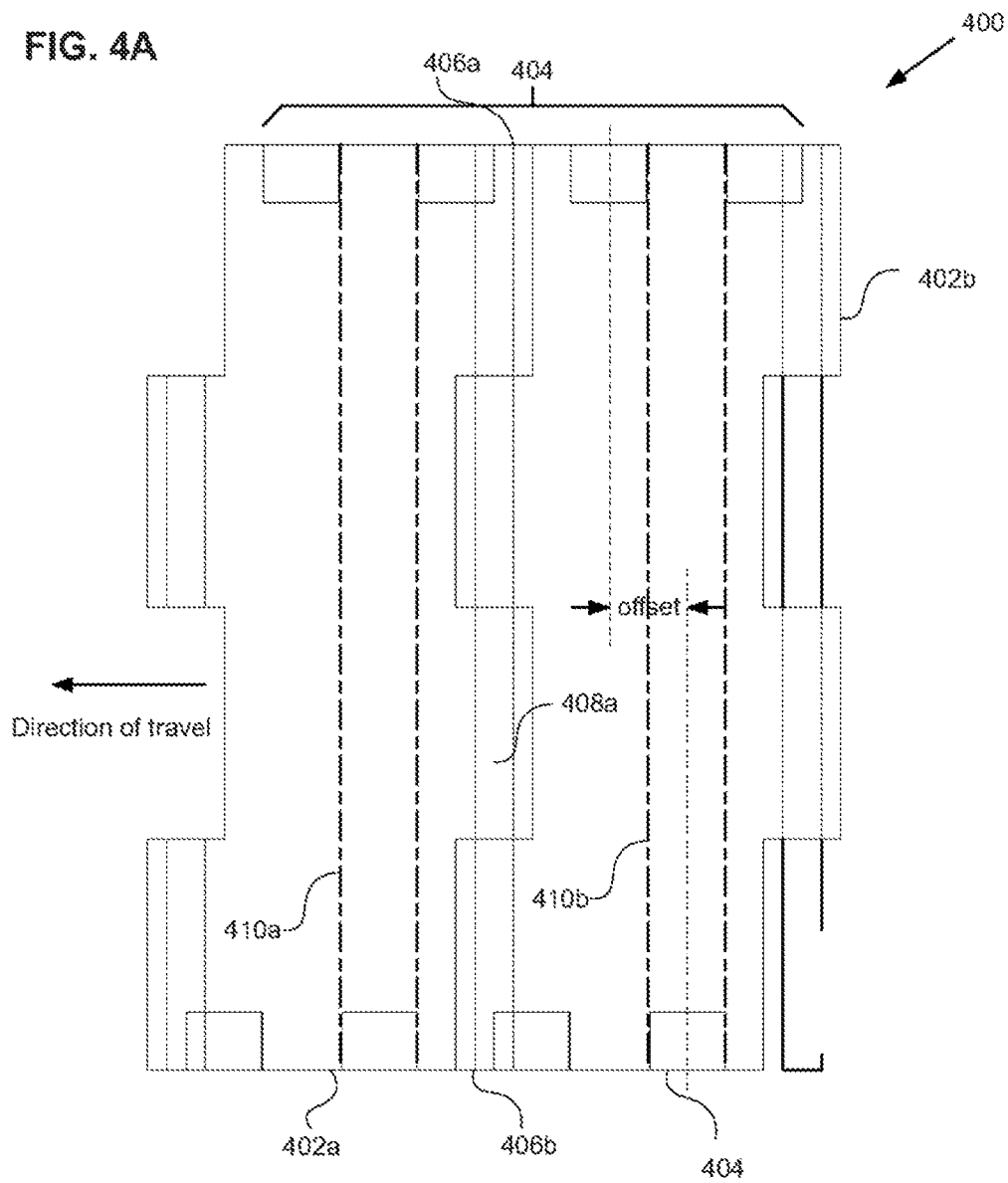
FIG. 4A is a plan view of a section of the track belt, according to one example.

FIG. 4A is a plan view of a section of the track belt 400, according to one example. The section of the track belt 400 comprises track belt links 402*a*, 402*b*, a shaft 408*a*, and a traction element 410*a*, 410*b*. The track belt link 402*a* is disposed adjacent to the identical track belt link 402*b*. The track belt link 402*a* has at least one link cylinder 406*a* and the track belt link 402*b* has at least one link cylinder 406*b*, with the at least one link cylinder 406*a* and the at least one link cylinder 406*b* disposed in alignment such that the shaft 408*a* may be disposed within both the at least one link cylinder 406*a* and the at least one link cylinder 406*b*, connecting the track belt link 402*a* and the track belt link 402*b* such that each of the track belt links 402*a* and the 402*b* may pivot about the shaft 408*a*.

Connecting a plurality of track belt links 402*a*, 402*b* and a plurality of shaft 408*a* in series as described in the above paragraph, and then connecting a first end of the plurality of track belt links 402*a*, 402*b* with a second end of the plurality of track belt links 402*a*, 402*b* to form a closed loop produces the track belt 400 as described by FIG. 1F.

The plurality of track belt links 402*a*, 402*b* may be connected to at least one belt stud 404 disposed on a surface of the plurality of track belt links 402*a*, 402*b* to receive propulsion force from the plurality of spokes 204 that may come into contact with the belt stud 404. The belt stud 404 may then transfer propulsion force to the track belt link 402.

In one example, a plurality of belt studs 404 is disposed in a line near a first edge of the track belt link 402. The first edge of the plurality of track belt links 402*a*, 402*b* is disposed on the tire track system 100 on a side of the wheel 104 facing away from the vehicle 102 and connected to the tread hub 202, such that the plurality of belt studs 404 faces and makes contact with at least one of the plurality of spokes 204 when the plurality of spokes 204 is extended.

In another example, as shown by FIG. 1G, the wheel 104 is connected to a second wheel spoke system 200 including tread hubs 202*a*, 202*b*, a first plurality of belt studs 404*a* is disposed in a line near a first edge of the track belt link 402, and a second plurality of belt studs 404*b* is disposed in a line near a second edge of the track belt link 402. The first edge of the plurality of track belt links 402*a*, 402*b* is disposed on the tire track system 100 on the side of the vehicle 102 connected to the tread hub 202*a*, such that the plurality of spokes 204*a* faces and makes contact with at least one of the plurality of belt studs 404*a* when the plurality of spokes 204*a* is extended. The second edge of the plurality of track belt links 402*a*, 402*b* is disposed on the tire track system 100 on the side of the vehicle 102 connected to the tread hub 202*b*, such that the plurality of spokes 204*b* faces and makes contact with at least one of the plurality of belt studs 404*b* when the plurality of spokes 204*b* is extended. The second plurality of belt studs 404 may be laterally offset from the first plurality of belt studs 404, as shown.

In another example, the first plurality of belt studs 404*a* may be aligned with the second plurality of belt studs 404*b*.

The entire inner surface of the track belt 400 is flat between the first and the second pluralities of belt studs 404*a*, 404*b*, and contacts a treaded surface of the tire 106 of the wheel 104 and a surface of the rollers 502*a*, 502*b*.

Each track belt link of the plurality of track belt links 402*a*, 402*b* may further comprise a plurality of belt studs 404 disposed on a surface of the plurality of track belt links 402*a*, 402*b* that makes contact with the tire 106 in the case the track belt 400 is fully assembled into a closed loop. Further, the track belt 400 may have more than one column of belt stud 404, for example in the direction of travel of the track belt 400, on each of the track belt link 402, such as two columns on each track belt link 402. Each of the belt studs 404 may be an integral portion of the plurality of track belt links 402*a*, 402*b* or it may be a separate, distinct part that is connected to the track belt link 402, for example through a mechanical fastener, adhesive, or some other joining method. Further, the plurality of belt studs 404 may be disposed with sufficient distance between columns on the plurality of track belt links 402*a*, 402*b* such that the plurality of belt studs 404 are not in the path of rotation of the tire 106 as the tire 106 rolls over the plurality of track belt links 402. Rather, the plurality of belt studs 404 may be adjacent to an outer plane of the tire 106, as shown by FIG. 1G and FIG. 4A.

Each track belt link of plurality of track belt links 402*a*, 402*b* may further comprise at least one traction element 410*a* or 410*b* disposed on a surface of the plurality of track belt links 402*a*, 402*b* that makes contact with a ground surface in the case the track belt 400 is fully assembled into a closed loop. The at least one traction element 410*a* or 410*b* may, for example, be a stud, spike, tread, groove, or knob.

Figure 4B:
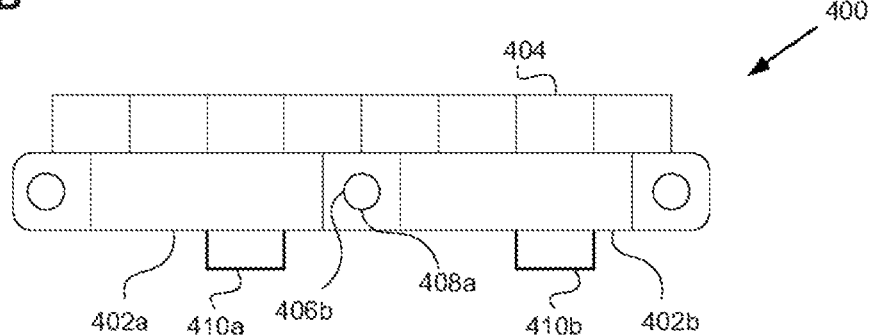
FIG. 4B is a side view of the track belt, according to one example.

FIG. 4B is a side view of the section of the track belt 400, according to one example. The section of track belt 400 is identical to that of FIG. 4A shown from the side. The track belt links 402*a*, 402*b* are disposed next to each other and rotatably connected about a shaft 408*a* disposed inside the link cylinders 406*a* and 406*b* of the track belt links 402*a*, 402b, respectively. The at least one traction element 410a, 410b are disposed on a surface of the 402a, 402b, respectively facing the ground surface.

FIG. 5 is a side view of a tensioning system 500, according to one example. The tensioning system 500 comprises the roller arm 504a, the roller arm 504b, the roller 502a, the roller 502b, and the tension device 506. The roller 502a is disposed in front of the tire 106 (as shown in FIG. 1E and FIG. 1F), and is rotatably connected to a first end of the roller arm 504a. A second end of the roller arm 504a is rotatably connected to the wheel hub 108, allowing the roller arm 504a to pivot relative to the wheel hub 108. The roller 502b is disposed behind the tire 106, and is rotatably connected to a first end of the roller arm 504b. A second end of the roller arm 504b is rotatably connected to the wheel hub 108, allowing the roller arm 504b to pivot relative to the wheel hub 108.

The tension device 506 is disposed between the roller 502a and the roller 502b, and is connected at a first end to the roller 502a and connected at a second end to the roller 502b. A tensile force applied between the roller arm 504a and the roller arm 504b by the tension device 506 maintains contact between the roller 502a and the tire 106, and contact between the roller 502b and the tire 106, providing a consistent distance around which the track belt 400 rotates (FIG. 1F).

The tension device 506 may be formed from a variety of devices, such as a mechanical spring, a hydraulic, an adjustable, comprised of a combination of the aforementioned elements, or other tensioning device.

Figure 6:
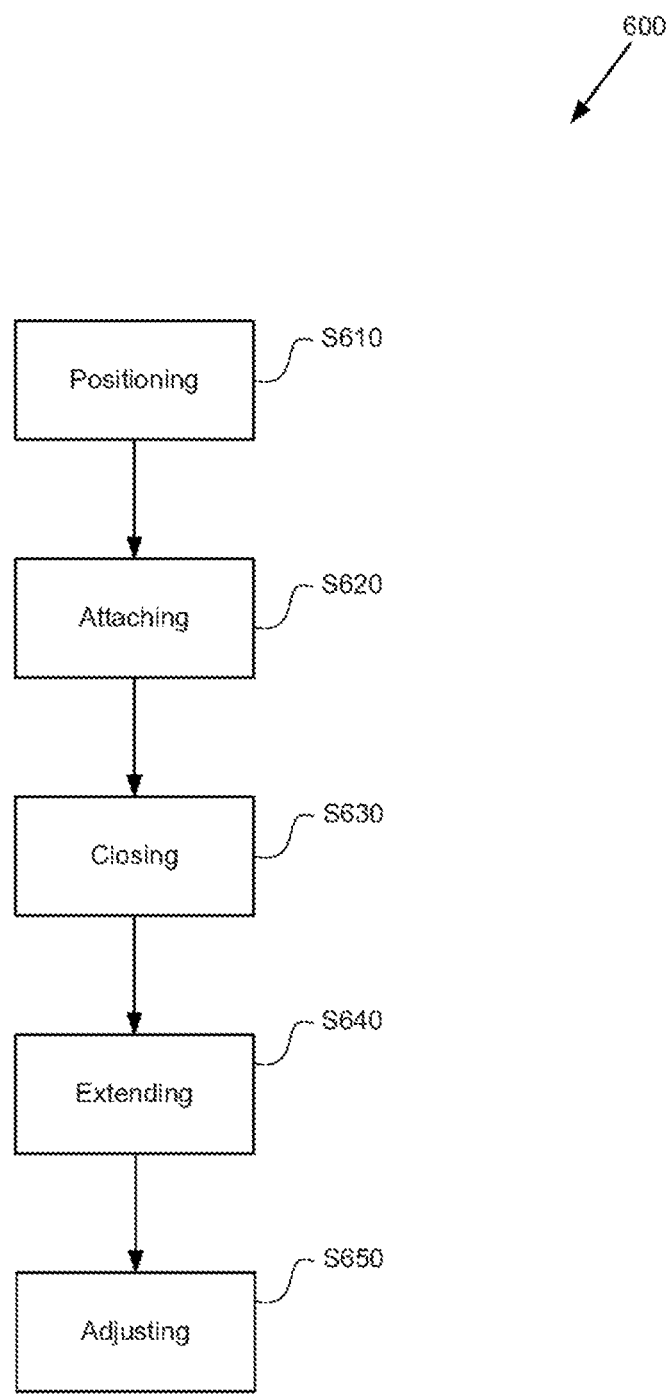
FIG. 6 is a diagram representing a sequence of primary processes of a method for converting a vehicle wheel and tire to a tire track system.

FIG. 6 is a diagram representing a sequence of primary processes of a method for converting a vehicle wheel 104 and tire 106 to a tire track system 100, according to one example. The converting method 600 includes a positioning process S610, an attaching process S620, a closing process S630, an extending process S640, and an adjusting process S650.

S610 represents a process of positioning a vehicle 102 onto a track belt 400 disposed on a ground surface, which may include driving, rolling, or lowering the vehicle 102 onto the track belt 400.

S620 represents a process of attaching a tensioning system 500 to the wheel 104, which may include connecting, hooking, fastening, or clipping the tensioning system 500 to a wheel hub 108 or the wheel 104.

S630 represents a process of closing the track belt 400 around the tire 106, which may include at least one of wrapping, pinning, latching, and clipping at least two track belt link of the plurality of track belt links 402a,402b.

S640 represents a process of extending at least one spoke 204 from the center of the wheel toward an inside surface of the closed track belt 400 to establish contact between the at least one spoke 204 and at least one belt stud 404 of the track belt 400.

S650 represents a process of adjusting tension in the tire track system 100 with the tension device 506 to maintain positions of a roller 502a and a roller 502b relative to the tire 106.

The steps may be performed manually or partially manually by a user, or automatically if the vehicle 102 is so equipped.

FIG. 7 is a diagram representing a sequence of primary processes of a method for operating a tire track system, according to one example. The operating method 700 includes an extending process S710, a turning process S720, and a propelling process S730. Further, the operating method 700 may include an additional adjusting process S740.

S710 represents a process of extending a spoke 204 connected to a tread hub 202 to a position to allow contact with a belt stud 404.

S720 represents a process of turning a wheel 104 to rotate the tread hub 202 and spoke 204 to make contact with a belt stud 404, and to put the belt stud 404 in motion.

S730 represents a process of propelling the tread hub 202 and the spoke 204 to drive the track belt 400 about the tire 106, the roller 502a, and the roller 502b at approximately the same angular speed as the tire 106.

S740 represents an additional process of adjusting a spoke 204 to increase or decrease tension applied to a track belt 400 to maintain optimal performance, particularly for a wheel 104 connected to a wheel spoke system 200 on each side of the wheel 104 as described by FIG. 1G.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. A tire track system for a vehicle, the system comprising:
   a tread hub rigidly connected to a driven wheel of the vehicle;
   a belt having internal teeth disposed on an inside surface of the belt;
   a plurality of spoke assemblies rigidly connected to the tread hub and positioned radially from a center of the tread hub, each spoke assembly of the plurality of spoke assemblies having:
      a spoke cylinder, and
      a spoke having:
         an inner portion slidably inserted in the spoke cylinder, and
         an outer portion that protrudes from the spoke cylinder by a radial length and that matches the internal teeth to provide engagement between the outer portion of the spoke and the internal teeth, wherein
   the driven wheel of the vehicle rotates the tread hub and force is transferred from the plurality of spoke assemblies to the internal teeth of the belt by independently adjusting the radial length throughout a rotation of the driven wheel to provide engagement of the outer portion of the spoke with one internal tooth of the internal teeth as the internal tooth approaches and departs from the driven wheel.

2. The system according to claim 1, wherein:
   the belt slows forward motion of the vehicle as a force is applied to the driven wheel of the vehicle to reduce a rotating speed of the driven wheel, the tread hub slows and transfers force from each spoke assembly to the internal teeth of the belt in a direction opposite of that of forward travel.

3. The system according to claim 1, further comprising:
   a plurality of pressure systems connected to the plurality of spokes, wherein each pressure system individually adjusts a pressure exerted on the inner portion of the spoke independently of the plurality of other pressure systems to adjust the radial length throughout the rotation of the driven wheel.

4. The system according to claim 1, wherein each pressure system further includes:
a pressure switch fluidly connected to the spoke cylinder; and
a pressure control unit connected to the switch to adjust the inner pressure exerted on the inner portion.

5. The system according to claim 4, wherein:
the pressure increases such that the outer portion of the spoke extends beyond an outer diameter of a tire of the driven wheel as the internal tooth departs from the driven wheel.

6. The system according to claim 4, wherein:
the pressure decreases such that the outer portion of the spoke retracts to not more than that of an outer diameter of the tire of the driven wheel as the internal tooth approaches from the driven wheel.

7. The system according to claim 4, wherein the pressure control unit includes:
a reservoir that stores a hydraulic fluid;
an output line that connects the reservoir to the switch;
a pump positioned on the output line between the reservoir and the switch that provides the hydraulic fluid to the switch;
an input line that connects the reservoir to the switch; and
a relief line between the output line and the input line that limits the fluid entering the switch to a predetermined maximum pressure.

8. The system according to claim 7 wherein the pressure control unit further includes a valve positioned on the relief line to adjust the predetermined maximum pressure.

9. The system according to claim 1, wherein a second tread hub is connected to a second side of the driven wheel, and the belt further includes supplemental internal teeth disposed along an edge around the inside surface of the belt that faces the second tread hub.

10. The system according to claim 9, wherein:
the inside surface of the belt is flat between the internal teeth and the supplemental internal teeth, and contacts and spans a surface of the tire of the driven wheel and a surface of the at least two rollers.

11. The system according to claim 9, wherein the supplemental internal teeth are laterally offset with the internal teeth.

12. The system according to claim 1, wherein the belt further includes a plurality of track belt links rotatably connectable to each other.

13. The system according to claim 12, wherein each track belt link of the plurality of track belt links has at least one link cylinder to receive a shaft and provide a rotatable connection between two consecutive track belt links of the plurality of track belt links.

14. A tire track system for a vehicle, the system comprising:
a tread hub rigidly connected to a driven wheel of the vehicle;
a belt in contact with the driven wheel and having internal teeth disposed on an inside surface of the belt;
at least two roller arms, each rotatably connected at a first end to the tread hub;
at least two rollers, each rotatably connected to a second end of the at least two roller arms;
a tensioning device, disposed to provide tension between the at least two roller arms;
a plurality of spoke assemblies rigidly connected to the tread hub and positioned radially from a center of the tread hub, each spoke assembly of the plurality of spoke assemblies having:
a spoke cylinder, and
a spoke having:
an inner portion slidably inserted in the spoke cylinder, and
an outer portion protruding from the spoke cylinder by a radial length; and
a plurality of pressure systems connected to the plurality of spokes, wherein each pressure system individually adjusts a pressure exerted on the inner portion of the spoke independently of the plurality of other pressure systems to adjust the radial length throughout a rotation of the driven wheel, wherein
the adjustment of the radial length throughout the rotation of the driven wheel provides engagement of the outer portion of the spoke with one internal tooth of the internal teeth as the internal tooth approaches and departs from the driven wheel.

15. The system according to claim 14, wherein
the tensioning device is a mechanical spring.

* * * * *